3,386,992
SULFATION OF GUAR AND LOCUST
BEAN GUM
Richard G. Schweiger, San Diego, Calif., assignor to
Kelco Company, San Diego, Calif., a corporation
of Delaware
No Drawing. Filed Feb. 14, 1966, Ser. No. 527,103
18 Claims. (Cl. 260—234)

ABSTRACT OF THE DISCLOSURE

Sulfate esters of relatively undegraded polymeric guar gum and locust bean gum having a degree of substitution ranging up to about 1.0, and salts thereof. Process for producing sulfate esters of guar gum or locust bean gum by hydrating said gum, removing water from said hydrated gum by treating it with a water-miscible organic solvent which is essentially a non-solvent for said gum, and then reacting said gum with a sulfur trioxide-amide complex in which the amide has the formula

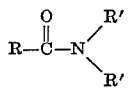

in which R' is a lower alkyl radical and R is selected from the group consisting of lower alkyl radicals and hydrogen.

---

This invention relates to a method of preparing undegraded sulfate esters of guar gum and locust bean gum. Further, the invention pertains to essentially undegraded sulfate esters of guar gum and locust bean gum and salts thereof as obtained by my method.

Prior art attempts to form sulfate esters of guar gum or locust bean gum have been unsuccessful in that sulfation reaction produced excessive degradation of the polymeric structure of the gum. This result occurred because of the violence of the esterification reaction which produced degradation of the polymer and also considerable heat.

An object of the present invention is to provide a process for producing sulfate esters of guar gum and locust bean gum in which the carbohydrate structure of the guar gum and locust bean gum remains relatively undegraded.

A further object of this invention is to provide essentially undegraded sulfate esters of guar gum and locust bean gum and salts of such esters.

Additional objects will appear from a reading of the specification and claims which follow.

In accord with my invention, I first activate the guar gum or locust bean gum so that it can be more readily sulfated. Activation is accomplished by dissolving the gum in water which is preferably heated to a temperature in the range of about 85 to about 90° C. to aid the hydration of the gum. After the gum has been placed in solution, it is precipitated by the addition of an organic solvent which is miscible with water but which is not a solvent for the locust bean gum or guar gum. Suitable solvents are the lower alcohols such as methanol, or ethanol, simple ketones such as acetone, or glacial acetic acid. A preferred solvent for precipitating the material from solution is acetone.

After precipitating the guar gum or locust bean gum, it is washed with one of the aforementioned water-miscible solvents (preferably acetone) to remove substantially all of the water. Optionally and preferably the material is then washed with an amide represented by the following formula:

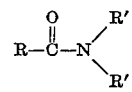

In the above formula R and R' may be a lower alkyl radical such as, for example, a methyl or ethyl radical. In addition, R can be hydrogen. A preferred amide for use in my process is dimethyl formamide. Other suitable amides may be employed, however, such as dimethyl acetamide, diethyl acetamide, and dimethyl propionamide. If desired, the amide may be added directly to the water solution of locust bean gum or guar gum to precipitate the gum from solution. Such a procedure is not generally employed because the quantities of amide required to cause precipitation are relatively large and the procedure is not as effective as that outlined above.

The above procedure is designed to remove essentially all of the water from the precipitated gum and, at the same time, to remove any substantial amounts of solvents, such as a lower alcohol, which would provide undesired side reactions during the subsequent sulfation reaction.

Following the activation of the guar gum or locust bean gum, the material is maintained in a wetted state with the solvent or amide employed in the final washing step. It is quite important that the activated gum not be allowed to dry prior to the succeeding sulfation reaction. Should this occur, the gum becomes deactivated such that it will not react in the desired manner during sulfation.

The wetted and activated guar gum or locust bean gum is then reacted with a complex or sulfur trioxide and an amide of the type specified previously. Preferably, the amide is dimethyl acetamide or dimethyl formamide. The complex is formed by adding sulfur trioxide to the amide with cooling of the reaction mixture to maintain the temperature below about 40° C. Preferably, a slight molar excess of the amide, such as dimethyl formamide, is employed for reaction with the sulfur trioxide. A suitable excess which I have employed requires 2 moles of the amide for each mole of sulfur trioxide. The complex is a crystalline solid which is in a wetted condition due to the excess of amide generally employed in its formation. The wetted crystalline solid material can be maintained under refrigeration, for example, at about 4 to 5° C., until ready for use.

The activated guar gum or locust bean gum is preferably reacted with the sulfur trioxide-amide complex in a closed mixer provided with a cooling jacket. The presence of moisture is undesirable since water will react preferentially with the sulfur trioxide-amide complex to form sulfuric acid, which produces degradation of the carbohydrate structure of the gum. It is for this reason that the reaction is preferably carried out in a closed system or in an equivalent manner such as blanketing the reaction mixture with a dry inert gas.

The sulfation reaction is carried out under agitation to promote an even reaction rate. Since both the sulfur trioxide-amide complex and the activated gum are solids, an excess of amide can be employed if desired to facilitate mixing and heat control during the sulfation reaction. Excess amide can, for example, be admixed with the activated guar gum or locust bean gum prior to the sulfation step, can be employed in excess in the formation of the sulfur trioxide-amide complex, or can be simply added to the reaction mixture along with the sulfur trioxide complex and the activated gum.

In conducting the sulfation reaction, I have found that a reaction temperature of about 0° C. to about 25° C. is suitable, and that preferably the temperature is below about 15° C. The reaction time required for complete esterification is generally from about one to several hours, depending upon the selected temperature and the relative concentrations of the reactants, including diluent and sulfur trioxide-amide complex in the reaction mixture. In general, I use a reaction time of about 2 to about 8 hours and preferably 3 to 4 hours.

The product which is obtained immediately following the esterification may be neutralized by adding a calculated amount of a suitable base to the reaction mixture. Essentially any base can be employed such as an alkali or alkaline earth metal hydroxide, carbonate, or bicarbonate, e.g., sodium carbonate, potassium hydroxide, magnesium hydroxide, calcium hydroxide, and the like. Further, compounds such as ammonium hydroxide, or any of the various ammonium compounds, or the various substituted amines such as methyl amine, ethyl amine, propyl amine, and the like can be employed.

Also, the sulfated product may be neutralized by first diluting the reaction mixture with water and then adding a base, as defined above. If the base employed is water soluble, it can conveniently be added in the from of an aqueous solution. The neutralized product can be precipitated by the addition of a water miscible solvent in which the sulfated product is insoluble. Suitable water miscible solvents are those outlined previously and include acetone, and lower alcohols such as methanol and ethanol.

It should be understood that the esters prepared according to my invention are half esters of sulfuric acid. Thus, one of the hydrogen ions originally present in the sulfuric acid is still free to react with a base to form salts. The course of my process may be visualized as having one of the valencies of sulfuric acid esterified with a hydroxyl group of the guar gum or locust bean gum, while the other hydrogen ion is subsequently substituted by salt formation on the addition of a suitable base. This is merely a way of visualizing the reaction since sulfation is accomplished through the sulfur trioxide-amide complex described previously and not through the use of sulfuric acid itself as a reactant.

Example I

Guar gum (220 g.) was dissolved in about 10 liters of water which had been preheated to 85° C. The gum then was precipitated in acetone, squeezed out on a screen, washed with acetone, and pressed out on a Büchner funnel. The fiber then was washed twice with dimethyl formamide (DMF), pressed out to remove excess DMF, and fluffed in a hammer mill. After this treatment, the fiber usually contained about 30% DMF. The activated fiber was placed in the reactor (sigma blade Day Mixer) and a calculated amount of DMF-SO$_3$-complex was added. The DMF-SO$_3$-complex employed contained 100% excess of DMF or two moles of DMF for each mole of SO$_3$. The material was mixed for 2.5 hours with cooling and exclusion of moisture. The amount of complex employed is indicated in the table below as moles of SO$_3$/unit weight of the gum. A unit of the guar gum has the empirical formula $C_6H_{10}O_5$ and a unit weight of the gum is equal to 162.14 grams.

After the reaction, 250 cc. of isopropyl alcohol was added. Subsequently, in order to facilitate the filtration of the free acid, some acetone was added. The material was squeezed out on a Büchner funnel, dissolved in ice water, and neutralized with a solution of sodium hydroxide. The product was precipitated with methanol when its degree of substitution (D.S.) was 0.3 or 0.31 and with acetone when its D.S. was 0.89 or 0.91. The precipitate was then washed with the corresponding solvent and dried at 45° in the presence of an air stream.

The results of several such experimental runs are set forth in the following table:

TABLE I

| Ratio, moles SO$_3$/unit of guar gum | Grams of product per 100 grams of starting material (guar gum) | D.S. |
|---|---|---|
| 1 | 121 | 0.31 |
| 1.5 | 117 | 0.30 |
| 2 | 132 | 0.91 |
| 2.5 | 151 | 0.89 |

The sulfates were re-precipitated from methanol or acetone before the determination of the D.S. The degree of substitution (D.S.) was determined by adding an aliquot of the sodium salt of the sulfated guar gum to a 10% aqueous solution of hydrogen chloride. The mixture was heated overnight, e.g., 15–20 hours, at reflux. The free sulfuric acid released was then determined gravimetrically by adding barium chloride to precipitate the sulfate ion as barium sulfate which was collected and weighed. This is a fairly standard analytical procedure.

As shown in the above table, the maximum degree of substitution of guar gum obtainable with my process is about 1. Each unit of guar gum contains 3 hydroxyl groups and thus the maximum degree of substitution theoretically possible is 3. However, the 3 hydroxyl groups do not have the same degree of reactivity. As shown above, one of the hydroxyl groups (assumedly the hydroxyl group on the 6-carbon atom) is sulfated while the others are not. The use of an excess of the sulfur trioxide-amide complex was shown to greatly improve the degree of substitution of the final product. When about 2 moles of sulfur trioxide complex were employed for each unit weight of the guar gum, the degree of substitution increased dramatically over that obtainable when sulfating with 1 or 1.5 moles of complex per unit weight of gum. It was found, however, that increasing the amount of sulfur trioxide complex in excess of 2 moles of complex for each unit weight of guar gum did not increase the degree of substitution.

Example II

Twenty grams of guar gum dissolved in 2 liters of hot water was precipitated by pouring into glacial acetic acid. The precipitate was washed twice with acetic acid, pressed out to remove as much acetic acid as possible, and sulfated with 120 g. of DMF-SO$_3$-complex as employed in Example I. The complex was added to the wet fiber and mixed in thoroughly. The mixture was then kept refrigerated over night in a closed container. The reaction product was washed with methanol, neutralized with sodium hydroxide, precipitated from methanol, and dried. The yield of product in the form of the sodium salt was 24 grams and the D.S. of the product was determined as 1.04.

Example II demonstrates an embodiment of my process in which the precipitated guar gum was washed with glacial acetic acid and then immediately sulfated with a complex of sulfur trioxide and dimethyl formamide. The procedure employed differed slightly from that in Example I where the precipitated gum was washed first with acetone and then with dimethyl formamide prior to treatment with the sulfur trioxide-dimethyl formamide complex. Example II demonstrates the broader scope of my process which involves activation by first hydrating the guar gum and then removing the water through washing with a water miscible solvent prior to sulfation with a sulfur trioxide-amide complex. The procedure of Example II produces a solvent mixture of dimethyl formamide and acetic acid in the reaction mixture. The procedure of Example I produces no solvent mixture since the amide employed in the sulfur trioxide complex and the amide employed for washing are one and the same. In this respect, the procedure of Example I is preferable to that of Example II.

To illustrate the necessity of properly activating the guar gum prior to the sulfation reaction, an experiment was performed in which the guar gum was dried following its hydration.

Example III

Guar (100 g.) was dissolved in hot water, then precipitated by adding methanol, and the precipitate was dried in an air stream. The dry fiber was mixed with amounts of DMF ranging from 0 to 400 grams for each 100 grams of gum and sulfation was attempted at molar ratios of $SO_3$-DMF-complex/unit weight of guar gum ranging from 2:1 to 3:1. In no case was any degree of substitution of the guar gum observed, i.e., the attempted sulfation reaction did not go.

The drying of the activated gum, as in Example III, was found to deactivate the guar gum such that it could not be sulfated. This demonstrates the criticality of maintaining the activated gum in a wetted state prior to sulfation.

Example IV

Locust bean gum (940 g.) was dissolved in hot water (90° C.). The solution was poured slowly into acetone, and the precipitate filtered off and pressed out. The precipitate was washed once with acetone and twice with DMF. The weight of the fiber after fluffing in a hammer mill was 2723 g. This material was divided into six equal portions and each was sulfated with varying amounts of DMF-$SO_3$-complex as employed in Example I. The amounts of complex employed are shown below in Table II. The reaction conditions were the same as those described in Example I in regard to sulfation of guar gum. After the reaction, acetone was added, the sulfated gum was filtered off and washed again with acetone, dissolved in ice water, and neutralized with a aqueous solution of sodium hydroxide. If the pH of the solution was above 9, glacial acetic acid was added to adjust it. The sodium salt was precipitated from methanol and, after being washed twice with methanol, dried at 45° C. in the presence of an air stream.

The results of several experimental runs carried out according to Example IV are set forth in the following table:

TABLE II

| Ratio, moles $SO_3$/unit weight of locust bean gum | Grams of product per 100 grams of starting material (locust bean gum) | D.S. |
| --- | --- | --- |
| 1 | 120 | 0.20 |
| 1.5 | 131 | 0.38 |
| 2 | 115 | 0.39 |
| 2.5 | 141 | 0.72 |
|  | 170 | 1.03 |

A unit weight of locust bean gum has the empirical formula $C_6H_{10}O_5$ and a unit weight of the gum is equal to 162.14 grams. The degree of substitution (D.S.) was determined in the manner described in Example I.

As shown in Example IV, a larger excess of sulfur trioxide-amide complex was required in the efficient sulfation of locust bean gum than was required in the sulfation of guar gum. It was found that the maximum degree of sulfation of locust bean gum obtainable with my process was approximately 1. This shows that of the three hydroxyl groups present in each unit of locust bean gum, only one of the hydroxyl groups is receptive to sulfation. This is presumably the primary hydroxyl group attached to the six carbon atoms which is assumedly more reactive than the other secondary hydroxyl groups. The use of an excess of sulfur trioxide-amide complex of about 200% (about 3 times that required for reaction with 1 hydroxyl group in each unit of the polymer) produced the maximum degree of substitution obtainable in my process. When still larger excesses of sulfur trioxide-amide complex were employed, no further improvement in the degree of substitution was obtained.

Example V

Locust bean gun (220 g.) was dissolved in hot water, precipitated by pouring the solution with stirring into acetone and the precipitate was washed four times with acetone to remove the water. The wet material, after pressing out, contained 75–85 grams of acetone. It was fluffed in a hammer mill and sulfated with approximately 860 g. of $SO_3$-DMF-complex (2 moles of $SO_3$/unit of locust bean gum) as employed in Example I. The product was neutralized with sodium hydroxide giving 214 grams of product having a D.S. of 0.3.

If locust bean gum was used without activation or if, in the procedure above, the precipitated guar gum was dried before the reaction, no appreciable sulfation occurred. As in the case of guar gum, it was found to be essential that the activated locust bean gum be maintained in a wetted state prior to the sulfation reaction.

Example V above differs somewhat from Example IV in that the water miscible solvent used in removing the water from the precipitated locust bean gum was not the same as the amide employed in forming the sulfur trioxide-amide complex. As a result, a solvent mixture of dimethyl formamide and acetone was produced in the reaction mixture. For this reason, the procedure of Example V is not as preferable as that employed in Example IV in which a solvent mixture is not produced in the reaction mixture.

As shown by the foregoing examples, my invention provides sulfate esters of essentially undergraded guar and locust bean gum and the salts thereof. The viscosities of the materials prepared according to my invention are in excess of 20 cps. and generally range in the order of about 20 to about 50 cps. in a 1% aqueous solution with the viscosities being measured at 25° C. using a Brookfield Viscometer, Model LVF, having a spindle rotating at 60 r.p.m. These viscosities clearly show that the materials are colloidal in nature and contain the essentially undegraded carbohydrate structure of guar gum or locust bean gum. In this respect, my products differ markedly from prior sulfated products of guar and locust bean gums in which the polymeric carbohydrate structure of the gum itself was degraded so that the resulting product was not colloidal and was not capable of producing viscosities in the order of those produced by my products.

My novel products can be employed as viscosity and emulsion stabilizers in a wide variety of products which contain proteins. As an example, my products may be employed as stabilizers for thickened milk products such as milk shakes, ice cream and the like.

In the foregoing description, I have referred to various temperatures, times, concentrations and the like. These references to specific conditions have been solely for purposes of illustration. Thus, I desire that my invention be limited only by the lawful scope of the appended claims.

I claim:

1. Sulfate esters of relatively undegraded polymeric carbohydrate gums selected from the group consisting of guar gum and locust bean gum having a degree of substitution up to about 1.0, and salts thereof selected from the group consisting of alkali, alkaline earth metal, ammonium compounds and lower alkyl amine.

2. The composition of claim 1 wherein said sulfate esters and salts thereof are capable of producing viscosities in excess of 20 centipoises in a 1% aqueous solution.

3. The composition of claim 1 wherein said salts contain an alkali metal.

4. The composition of claim 3, wherein said salts contain sodium.

5. A process for producing sulfate esters of essentially undegraded polymeric carbohydrate gums selected from the group consisting of guar gum and locust bean gum, said process comprising hydrating a gum selected from the group consisting of guar and locust bean gum, removing water from said hydrated gum by treating it with a water miscible organic solvent which is essentially a non-solvent for said gum, and reacting said gum with a sulfur trioxide amide complex wherein said amide has the formula

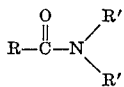

in which R' is a lower alkyl radical and R is selected from the group consisting of lower alkyl radicals and hydrogen.

6. The process of claim 5 wherein said amide is dimethyl formamide.

7. The process of claim 5 wherein said gum is reacted with a sulfur trioxide-amide complex at a reaction temperature of about 0° C. to about 25° C.

8. The process of claim 5 wherein said sulfate ester is neutralized by reaction with a base.

9. A process for producing a sulfate ester of essentially undegraded guar gum having a viscosity in a 1% aqueous solution in excess of 20 centipoises, said process comprising hydrating guar gum, removing water from said hydrated gum by treating it with a water miscible organic solvent which is essentially a non-solvent for said gum, removing said water miscible solvent by washing said gum with an amide having the formula

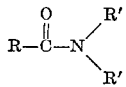

in which R' is a lower alkyl radical and R is selected from the group consisting of lower alkyl radicals and hydrogen, and reacting said gum with a sulfur trioxide-amide complex wherein said amide has the formula

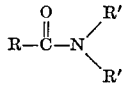

in which R' is a lower alkyl radical and R is selected from the group consisting of lower alkyl radicals and hydrogen.

10. The process of claim 9 wherein the reaction of said guar gum with said sulfur trioxide-amide complex is carried out at a temperature of about 0° C. to about 25° C.

11. The process of claim 10 wherein about 2 moles of said sulfur trioxide complex are employed as a reactant for each unit weight of said guar gum, and the degree of substitution of said resulting sulfate ester is about 1.

12. The process of claim 10 wherein said amide employed for washing said guar gum is dimethyl formamide and the amide present in said sulfur trioxide complex is dimethyl formamide.

13. The process of claim 12 wherein said sulfur trioxide complex contains a molar excess of dimethyl formamide.

14. A process for producing a sulfate ester of essentially undegraded locust bean gum having a viscosity in a 1% aqueous solution in excess of 20 centipoises, said process comprising hydrating locust bean gum, removing water from said hydrated gum by treating it with a water miscible inorganic solvent which is essentially a non-solvent for said gum, removing said water miscible solvent by washing said gum with an amide having the formula

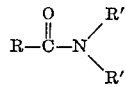

in which R' is a lower alkyl radical and R is selected from the group consisting of lower alkyl radicals and hydrogen, and reacting said gum with a sulfur trioxide-amide complex wherein said amide has the formula

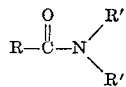

in which R' is a lower alkyl radical and R is selected from the group consisting of lower alkyl radicals and hydrogen.

15. The process of claim 14 wherein the reaction of said locust bean gum with said sulfur trioxide-amide complex is carried out at a temperature of about 0° C. to about 25° C.

16. The process of claim 14 wherein about 3 moles of said sulfur trioxide complex are employed as a reactant for each unit weight of said locust bean gum, and the degree of substitution of said resulting sulfate ester is about 1.

17. The process of claim 14 wherein said amide employed for washing said locust bean gum is dimethyl formamide and the amide present in said sulfur trioxide complex is dimethyl formamide.

18. The process of claim 14 wherein said sulfur trioxide complex contains a molar excess of dimethyl formamide.

References Cited

UNITED STATES PATENTS

| | | | |
|---|---|---|---|
| 2,477,544 | 7/1949 | Moe | 260—209 |
| 3,042,668 | 7/1962 | Monti et al. | 260—209 |
| 3,200,110 | 8/1965 | Gollin et al. | 260—234 |

LEWIS GOTTS, *Primary Examiner.*

JOHNNIE R. BROWN, *Examiner.*